United States Patent  
Borgeson et al.

(10) Patent No.: US 6,629,059 B2
(45) Date of Patent: Sep. 30, 2003

(54) HAND HELD DIAGNOSTIC AND COMMUNICATION DEVICE WITH AUTOMATIC BUS DETECTION

(75) Inventors: Dale W. Borgeson, Minneapolis, MN (US); Moises A. DelaCruz, Cottage Grove, MN (US)

(73) Assignee: Fisher-Rosemount Systems, Inc., Austin, TX (US)

(*) Notice: Subject to any disclaimer, the term of this patent is extended or adjusted under 35 U.S.C. 154(b) by 0 days.

(21) Appl. No.: 10/097,084

(22) Filed: Mar. 12, 2002

(65) Prior Publication Data

US 2002/0167904 A1 Nov. 14, 2002

Related U.S. Application Data

(63) Continuation-in-part of application No. 09/855,179, filed on May 14, 2001.

(51) Int. Cl.[7] .............................................. G06F 11/30
(52) U.S. Cl. ........................................ 702/183; 700/79
(58) Field of Search ................................. 702/183, 188; 700/79, 282, 37, 2, 50; 370/85, 228; 395/200.61; 364/148, 200, 154; 359/172; 345/835

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,855,858 A | 12/1974 | Cushing | 73/194 EM |
| 3,973,184 A | 8/1976 | Raber | 324/51 |

(List continued on next page.)

FOREIGN PATENT DOCUMENTS

| | | |
|---|---|---|
| DE | 35 40 204 C1 | 9/1986 |
| DE | 40 08 560 A1 | 9/1990 |
| DE | 32 13 866 A1 | 10/1993 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |

(List continued on next page.)

OTHER PUBLICATIONS

U.S. patent application Ser. No. 09/169,873, Eryurek et al., filed Oct. 12, 1998.
U.S. patent application Ser. No. 09/175,832, Eryurek et al., filed Oct. 19, 1998.
U.S. patent application Ser. No. 09/257,896, Eryurek et al., filed Feb. 25, 1999.

(List continued on next page.)

*Primary Examiner*—Michael Nghiem
*Assistant Examiner*—Xiuqin Sun
(74) *Attorney, Agent, or Firm*—Westman, Champlin & Kelly, P.A.

(57) ABSTRACT

A hand-held communication and diagnostic tool is provided. The tool is able to automatically detect connection to a process control loop as well as detect the type of loop to which it is connected without substantially disturbing messaging on the loop. Once the tool determines the type of loop to which it is connected, it provides suitable communication and diagnostics appropriate to that specific type.

16 Claims, 2 Drawing Sheets

U.S. PATENT DOCUMENTS

| | | | |
|---|---|---|---|
| RE29,383 E | 9/1977 | Gallatin et al. | 137/14 |
| 4,058,975 A | 11/1977 | Gilbert et al. | 60/39.28 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,250,490 A | 2/1981 | Dahlke | 340/870.37 |
| 4,337,516 A | 6/1982 | Murphy et al. | 364/551 |
| 4,399,824 A | 8/1983 | Davidson | 128/736 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,571,689 A | 2/1986 | Hildebrand et al. | 364/481 |
| 4,630,265 A * | 12/1986 | Sexton | 370/228 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,873,655 A | 10/1989 | Kondraske | 364/553 |
| 4,907,167 A | 3/1990 | Skeirik | 364/500 |
| 4,924,418 A | 5/1990 | Bachman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,043,862 A | 8/1991 | Takahashi et al. | 364/162 |
| 5,053,815 A | 10/1991 | Wendell | 355/208 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |
| 5,469,735 A | 11/1995 | Watanabe | 73/118.1 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |
| 5,633,809 A | 5/1997 | Wissenbach et al. | 364/510 |
| 5,637,802 A | 6/1997 | Frick et al. | 73/724 |
| 5,640,491 A | 6/1997 | Bhat et al. | 395/22 |
| 5,654,869 A | 8/1997 | Ohi et al. | 361/540 |
| 5,661,668 A | 8/1997 | Yemini et al. | 364/550 |
| 5,665,899 A | 9/1997 | Willcox | 73/1.63 |
| 5,669,713 A | 9/1997 | Schwartz et al. | 374/1 |

| | | | | | | |
|---|---|---|---|---|---|---|
| 5,671,335 A | 9/1997 | Davis et al. .................. 395/23 | | 6,377,859 B1 * | 4/2002 | Brown et al. ................. 700/79 |
| 5,675,504 A | 10/1997 | Serodes et al. ............. 364/496 | | 6,405,099 B1 | 6/2002 | Nagai et al. ................ 700/159 |
| 5,675,724 A | 10/1997 | Beal et al. ............. 395/182.02 | | 6,425,038 B1 | 7/2002 | Sprecher ..................... 710/269 |
| 5,680,109 A | 10/1997 | Lowe et al. ................ 340/608 | | 6,473,656 B1 | 10/2002 | Langels et al. .............. 700/17 |
| 5,700,090 A | 12/1997 | Eryurek ...................... 374/210 | | 6,480,793 B1 | 11/2002 | Martin ........................ 702/45 |
| 5,703,575 A | 12/1997 | Kirkpatrick ........... 340/870.17 | | 2002/0013629 A1 | 1/2002 | Nixon et al. |
| 5,704,011 A | 12/1997 | Hansen et al. ................ 395/22 | | 2002/0145568 A1 | 10/2002 | Winter ...................... 343/701 |
| 5,705,978 A | 1/1998 | Frick et al. ................ 340/511 | | | | |

FOREIGN PATENT DOCUMENTS

| | | |
|---|---|---|
| 5,708,211 A | 1/1998 | Jepson et al. ............ 73/861.04 |
| 5,708,585 A | 1/1998 | Kushion .............. 364/431.061 |
| 5,710,370 A | 1/1998 | Shanahan et al. ............ 73/1.35 |
| 5,710,708 A | 1/1998 | Wiegand ................. 364/470.1 |
| 5,713,668 A | 2/1998 | Lunghofer et al. ......... 374/179 |
| 5,719,378 A | 2/1998 | Jackson, Jr. et al. ........ 219/497 |
| 5,736,649 A | 4/1998 | Kawasaki et al. ....... 73/861.23 |
| 5,741,074 A | 4/1998 | Wang et al. ................ 374/185 |
| 5,742,845 A | 4/1998 | Wagner ...................... 395/831 |
| 5,746,511 A | 5/1998 | Eryurek et al. ................ 374/2 |
| 5,747,701 A | 5/1998 | Marsh et al. ............. 73/861.23 |
| 5,752,008 A | 5/1998 | Bowling ..................... 395/500 |
| 5,764,539 A | 6/1998 | Rani .......................... 364/557 |
| 5,764,891 A | 6/1998 | Warrior ................... 395/200.2 |
| 5,781,878 A | 7/1998 | Mizoguchi et al. ......... 701/109 |
| 5,790,413 A | 8/1998 | Bartusiak et al. ........... 364/485 |
| 5,801,689 A | 9/1998 | Huntsman ................... 345/329 |
| 5,805,442 A | 9/1998 | Crater et al. ................. 364/138 |
| 5,817,950 A | 10/1998 | Wiklund et al. ......... 73/861.66 |
| 5,828,567 A | 10/1998 | Eryurek et al. ............... 700/79 |
| 5,829,876 A | 11/1998 | Schwartz et al. ............. 374/1 |
| 5,848,383 A | 12/1998 | Yunus ........................ 702/102 |
| 5,859,964 A | 1/1999 | Wang et al. ........... 395/185.01 |
| 5,876,122 A | 3/1999 | Eryurek ...................... 374/183 |
| 5,880,376 A | 3/1999 | Sai et al. ................. 73/861.08 |
| 5,887,978 A | 3/1999 | Lunghofer et al. ......... 374/179 |
| 5,908,990 A | 6/1999 | Cummings ............... 73/861.22 |
| 5,923,557 A | 7/1999 | Eidson .................. 364/471.03 |
| 5,924,086 A | 7/1999 | Mathur et al. ................ 706/25 |
| 5,926,778 A | 7/1999 | Pöppel ....................... 702/130 |
| 5,936,514 A | 8/1999 | Anderson et al. ....... 340/310.01 |
| 5,940,290 A | 8/1999 | Dixon ........................ 364/138 |
| 5,956,663 A | 9/1999 | Eryurek ...................... 702/183 |
| 5,970,430 A | 10/1999 | Burns et al. ................ 702/122 |
| 6,014,902 A | 1/2000 | Lewis et al. ............. 73/861.12 |
| 6,016,523 A | 1/2000 | Zimmerman et al. ......... 710/63 |
| 6,016,706 A | 1/2000 | Yamamoto et al. ................ 9/6 |
| 6,017,143 A | 1/2000 | Eryurek et al. ............... 700/51 |
| 6,023,399 A | 2/2000 | Kogure ........................ 361/23 |
| 6,038,579 A | 3/2000 | Sekine ....................... 708/400 |
| 6,045,260 A | 4/2000 | Schwartz et al. ........... 374/183 |
| 6,047,220 A | 4/2000 | Eryurek ...................... 700/28 |
| 6,047,222 A | 4/2000 | Burns et al. ................. 700/79 |
| 6,052,655 A | 4/2000 | Kobayashi et al. .......... 702/184 |
| 6,061,603 A | 5/2000 | Papadopoulos et al. ....... 700/83 |
| 6,119,047 A | 9/2000 | Eryurek et al. ............... 700/28 |
| 6,119,529 A | 9/2000 | Di Marco et al. ........ 73/861.68 |
| 6,139,180 A | 10/2000 | Usher et al. ................... 374/1 |
| 6,151,560 A | 11/2000 | Jones ......................... 702/58 |
| 6,192,281 B1 | 2/2001 | Brown et al. ................... 700/2 |
| 6,195,591 B1 | 2/2001 | Nixon et al. ................... 700/2 |
| 6,199,018 B1 | 3/2001 | Quist et al. ................... 702/34 |
| 6,209,048 B1 | 3/2001 | Wolff .......................... 710/62 |
| 6,236,948 B1 | 5/2001 | Eck et al. ...................... 702/45 |
| 6,263,487 B1 | 7/2001 | Stripf et al. ................... 717/1 |
| 6,272,438 B1 | 8/2001 | Cunningham et al. ....... 702/56 |
| 6,298,377 B1 | 10/2001 | Hartikainen et al. ........ 709/223 |
| 6,307,483 B1 | 10/2001 | Westfield et al. ...... 340/870.11 |
| 6,311,136 B1 | 10/2001 | Henry et al. .................. 702/45 |
| 6,317,701 B1 | 11/2001 | Pyotsia et al. .............. 702/188 |
| 6,327,914 B1 | 12/2001 | Dutton ................. 73/861.356 |
| 6,360,277 B1 | 3/2002 | Ruckley et al. ................ 9/250 |
| 6,370,448 B1 * | 4/2002 | Eryurek ..................... 700/282 |

| | | |
|---|---|---|
| DE | 299 17 651 U1 | 12/2000 |
| DE | 100 36 971 A1 | 2/2002 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 825 506 A2 | 7/1997 |
| EP | 0 827 096 A2 | 9/1997 |
| EP | 0 838 768 A2 | 9/1997 |
| EP | 0 807 804 A2 | 11/1997 |
| EP | 1 058 093 A1 | 5/1999 |
| EP | 1 022 626 A2 | 7/2000 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 342 453 A | 4/2000 |
| GB | 2 347 232 A | 8/2000 |
| JP | 58-129316 | 8/1983 |
| JP | 59-116811 | 7/1984 |
| JP | 59-163520 | 9/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 64-01914 | 1/1989 |
| JP | 64-72699 | 3/1989 |
| JP | 2-05105 | 1/1990 |
| JP | 3-229124 | 10/1991 |
| JP | 5-122768 | 5/1993 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| WO | WO 94/25933 | 11/1994 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/13677 | 4/1998 |
| WO | WO 98/20469 | 5/1998 |

| | | |
|---|---|---|
| WO | WO 98/39718 | 9/1998 |
| WO | WO 98/06024 | 12/1998 |
| WO | WO 99/19782 | 4/1999 |
| WO | WO 00/41050 | 7/2000 |
| WO | WO 00/55700 | 9/2000 |
| WO | WO 00/70531 | 11/2000 |
| WO | WO 01/77766 | 10/2001 |
| WO | WO 02/27418 | 4/2002 |

OTHER PUBLICATIONS

U.S. patent application Ser. No. 09/303,869, Eryurek et al., filed May 3, 1999.

U.S. patent application Ser. No. 09/335,212, Kirkpatrick et al., filed Jun. 17, 1999.

U.S. patent application Ser. No. 09/344,631, Eryurek et al., filed Jun. 25, 1999.

U.S. patent application Ser. No. 09/360,473, Eryurek et al., filed Jul. 23, 1999.

U.S. patent application Ser. No. 09/369,530, Eryurek et al., filed Aug. 6, 1999.

U.S. patent application Ser. No. 09/383,828, Eryurek et al., filed Aug. 27, 1999.

U.S. patent application Ser. No. 09/384,876, Eryurek et al., filed Aug. 27, 1999.

U.S. patent application Ser. No. 09/406,263, Kirkpatrick et al., filed Sep. 24, 1999.

U.S. patent application Ser. No. 09/409,098, Eryurek et al., filed Sep. 30, 1999.

U.S. patent application Ser. No. 09/409,114, Eryurek et al., filed Sep. 30, 1999.

U.S. patent application Ser. No. 09/565,604, Eruyrek et al., filed May 4, 2000.

U.S. patent application Ser. No. 09/576,450, Wehrs, filed May 23, 2000.

U.S. patent application Ser. No. 09/606,259, Eryurek, filed Jun. 29, 2000.

U.S. patent application Ser. No. 09/616,118, Eryurek et al., filed Jul. 14, 2000.

U.S. patent application Ser. No. 09/627,543, Eryurek et al., filed Jul. 28, 2000.

U.S. patent application Ser. No. 09/576,719, Coursolle et al., filed May 23, 2000.

U.S. patent application Ser. No. 09/799,824, Rome et al., filed Mar. 5, 2001.

U.S. patent application Ser. No. 09/855,179, Eryurek et al., filed May 14, 2001.

U.S. patent application Ser. No. 09/852,102, Eryurek et al., filed May 9, 2001.

* cited by examiner

HAND HELD DIAGNOSTIC AND COMMUNICATION DEVICE WITH AUTOMATIC BUS DETECTION

CROSS REFERENCE TO RELATED APPLICATIONS

The present application is a Continuation-in-Part Application of patent application Ser. No. 09/855,179, filed May 14, 2001, entitled "DIAGNOSTICS FOR INDUSTRIAL PROCESS AND CONTROL MEASUREMENT SYSTEMS."

BACKGROUND OF THE INVENTION

The present invention relates to process control and measurement. More specifically, the present invention relates to a hand-held diagnostic and communication device for use in conjunction with process control measurement systems.

Hand-held communicators are known. One example of such a communicator is the Model 275 Highway Addressable Remote Transducer (HART) communicator. The HART communicator is a hand-held device that provides a common communication link to all HART-compatible, microprocessor-based instruments. The HART communicator interfaces with HART compatible devices and communicates using the Bell 202 frequency shift key (FSK) technique of providing high-frequency digital signals superimposed on a standard transmitter current loop of 4–20 mA. The HART communicator provides a number of known diagnostic and communication functions which facilitate maintenance of the process devices. In fact, the HART communicator can streamline regulatory documentation preparation through access to historic configuration and as found/as left data. While the HART Model 275 communicator is recognized as a valuable asset to the maintenance of process control instrumentation, it is slightly limited in one regard. Specifically, the Model 275 can only be used in conjunction with HART-compatible process devices. Additional tools are also available for other process industry protocols, but to date, no one has provided an effective hand-held device that can be used in conjunction with process industry protocols having different physical layer specifications.

In a process control installation employing process devices communicating in accordance with varying physical layer specifications, maintenance personnel would be forced to carry protocol-specific hand-held devices to interact with each and every device of a distinct protocol. While such a situation is undesirable, the solution is either to standardize upon a single process industry protocol, or work with one set of process industry protocol devices at a time.

A hand-held device that could operate on different process communication loops having differing physical specifications would facilitate the process device maintenance and allow an operator to access varying devices without the necessity of having to carry around multiple hand-held communication and diagnostic devices. One of the primary technical hurdles to building such a device is the different physical layer specifications themselves. For example, a device adapted to communicate in accordance with one physical layer specification may actually cause damage if employed upon a process control loop requiring a different specification. A device that solves the above technical hurdles and provides use for different physical layer specifications would vastly simplify the maintenance of process control devices.

SUMMARY OF THE INVENTION

A hand-held communication and diagnostic tool is provided. The tool is able to automatically detect connection to a process control loop as well as detect the type of loop to which it is connected without substantially disturbing messaging on the loop. Once the tool determines the type of loop to which it is connected, it provides suitable communication and diagnostics appropriate to that specific type.

DETAILED DESCRIPTION OF THE PREFERRED EMBODIMENTS

Figure 1:
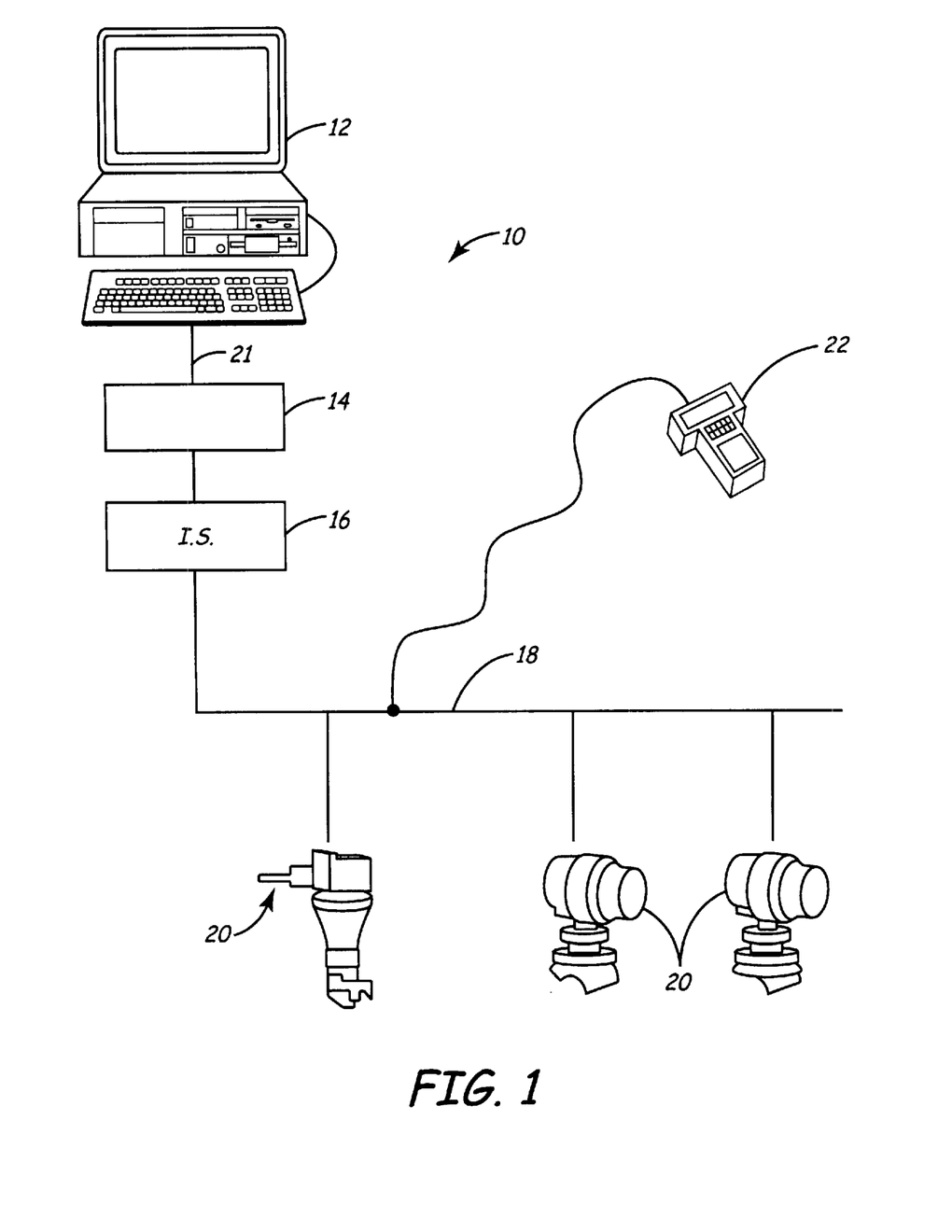
FIG. 1 is a diagrammatic view of a process measurement and control system for which embodiments of the present invention are particularly useful.

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled to process communication loop 18 in a multi-drop configuration. An alternative process communication (or process control) loop (not shown) is an HART® process communication loop. The HART® protocol operates using the frequency shift keying (FSK) principle, which is based on the Bell 202 communication standard. The digital signal is made up from two frequencies—1200 Hz and 2200 Hz, representing bits 1 and 0, respectively. HART® installations can be operated in so-called point-to-point configurations as well as multi-drop configurations. FIG. 1 illustrates a multi-drop wiring configuration that vastly simplifies system wiring compared to other topologies such as the star topology. Multi-drop HART® configurations support a maximum of 15 devices, while multi-drop Fieldbus configurations support a maximum of 32 devices.

Hand-held communicator and diagnostic device 22 is coupled to loop 18 as illustrated in FIG. 1. When coupled to a process control loop as shown, device 22 can perform a number of the communication and diagnostic functions set forth in the parent application. In addition, device 22 can couple to and interact with an HART process control loop (not shown) in much the same way the presently available HART Model 275 Communicator can. In order to comply with the various different dictates of the HART and FOUNDATION™ Fieldbus physical layer (PHY) transmit behavior, as well as complying with intrinsic safety requirements, separate network connections are provided on device 22 for HART and Fieldbus connections.

Figure 2:
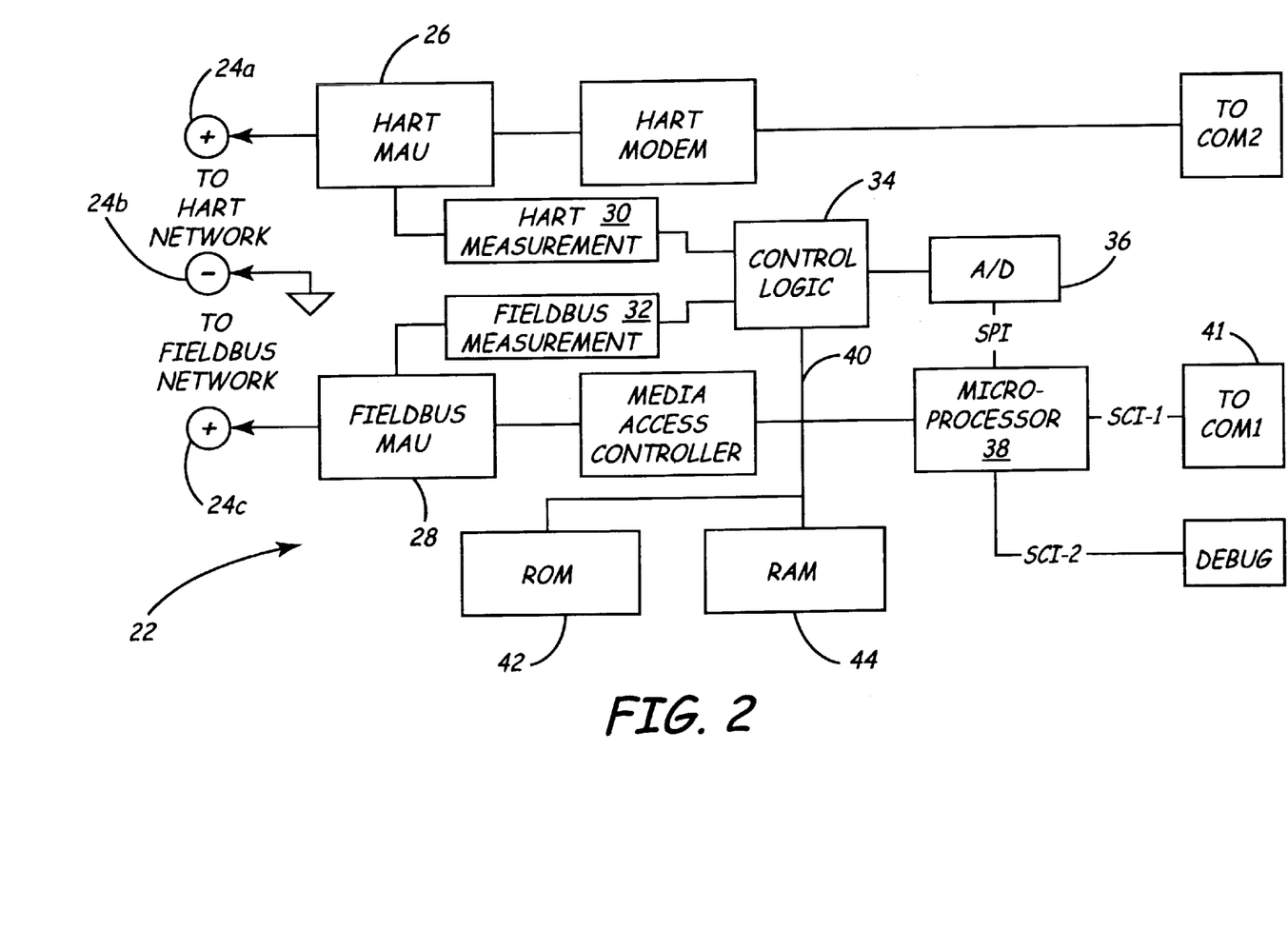
FIG. 2 is a system block diagram of a portion of a hand-held communication and diagnostic device in accordance with an embodiment of the present invention.

FIG. 2 is a block diagram of a portion of device 22 in accordance with an embodiment of the present invention.

Device 22 includes three network connection terminals, two positive terminals (24A, 24C) and a single common terminal (24B). Positive terminal 24A and common terminal 24B are used to coupled device 22 to a HART network. The other positive terminal (24C) and common terminal 24B are used to connect device 22 to a FOUNDATION™ Fieldbus network. The separate network connections are used in order to facilitate compliance with intrinsic safety requirements and simultaneously comply with the different physical layer transmit behaviors of the HART and Fieldbus protocols. Compliance with intrinsic safety requirements means compliance with one or more portions of the standard promulgated by Factory Mutual Research in October, 1998, entitled APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610.

When operating with a HART process control loop, device 22 must not sink or source a direct current (DC). To meet this requirement, the HART physical layer circuit (also referred to as HART MAU) 26 is designed to impose a voltage signal on process control loop 18 in the same manner that the currently available HART Model 275 imposes such a voltage.

To meet the intrinsic safety requirement for FOUNDATION™ Fieldbus, device 22 must not inject any energy into process control loop 18. To meet this requirement, the FOUNDATION™ Fieldbus physical layer circuit (also referred to herein as Fieldbus MAU 28) will sink a DC current (preferably using a shunt current regulator, for example) of approximately 20 mA and then during message transmission, modulate that current by approximately +/−8 mA. Because the two protocols have two fundamentally different (and conflicting) ways of communicating, the circuitry of device 22 must never sink current in a HART process control loop nor inject energy (impose a voltage) in a FOUNDATION™ Fieldbus network.

Since device 22 includes separate connections and media access circuits (26, 28) for the different process control loops, it is possible for a user to connect device 22 to the wrong network (e.g. connect HART MAU 26 to a FOUNDATION™ Fieldbus network or vice versa). In order to deal with such an user error, device 22 ensures that upon initial connection, the media access units (MAU's) remain passive and do not attempt to modulate the network media.

Device 22 includes measurement circuits that consist of four measurement signal conditioning circuits, one for the HART MAU (26) and three for the Fieldbus MAU 28. In addition, both HART measurement circuit 30 and Fieldbus measurement circuits 32 have a circuit that can sink a small amplitude short duration current from the network. In this embodiment, the FOUNDATION™ Fieldbus measurement signal conditioning circuit 32 comprises three measurement conditioning circuits (collectively Fieldbus measurement circuit 32) that scale the voltage signal on the FOUNDATION™ Fieldbus network connector (24B, 24C) to measure DC voltage, communications signal amplitude, and network or loop noise. The HART measurement circuit 30 includes a circuit to measure the DC voltage on the network. These four signal conditioning circuits all feed control logic block 34. Control logic block 34 includes a multiplexer that is connected to an analog-to-digital converter 36. Control logic block 34 is accessed by microprocessor 38 via 16-bit parallel bus 40.

When device 22 is first turned on, microprocessor 38 commands analog-to-digital converter 36 to alternately monitor the DC voltage on both the HART and Fieldbus network connection terminals. During this state, device 22 will not disturb the network (also referred to herein as process control loop) in any way (i.e. sink/source current or impose a voltage). If there are no network connections, the voltage measured will be near zero on both loop connections. When one of the MAU terminals is connected to a loop (i.e. through connections 24A and 24B or 24C and 24B), a DC voltage will be measured on one MAU and not the other. A HART process control loop will cause a voltage between approximately 12 and 50 volts DC to be measured while a FOUNDATION™ Fieldbus loop connection will cause a voltage between approximately 9 and 32 volts DC to be measured. The mechanical design of the loop connection terminals is preferably selected such that it is impossible to connect both the HART and FOUNDATION™ Fieldbus media access units (MAU) 26, 28 to a process loop at the same time. This mechanical configuration ensures that if a DC voltage is measured on one media access unit, there will not be a DC voltage on the other.

Once a DC voltage is recognized, the polarity is measured to determine whether the loop connection leads are correctly connected. Specifically, if the DC voltage measured between common lead 24B and one of leads 24A and 24C has a negative polarity, that means that the loop connection leads are reversed. Microprocessor 38 then sends a message to the host processor (not shown) via Com-1 illustrated at 41 and the host processor will display a message informing the user that the loop connection must be reversed.

As indicated above, there is an overlap between the operating DC voltages used on both HART and Fieldbus process communication loops. Therefore, DC voltage alone cannot be used to reliably indicate the type of loop to which device 22 is connected. To determine loop type, device 22 actually measures the DC impedance of the process control loop (preferably having a reasonable DC voltage and correct lead polarity). Device 22 measures network DC impedance by sinking 1 mA of current for a very shot duration, such as 5 milliseconds. This disturbance generates a voltage pulse along the process control loop that is proportional to the DC impedance of the process control loop itself. There is a distinguishing range of impedance between HART and FOUNDATION™ Fieldbus process control loops. The signal that device 22 observes in response to the disturbance it generates also contains any HART or FOUNDATION™ Fieldbus communication signals that may be present on the process control loop. The communication signals themselves are filtered using a suitable low-pass filter so that only the effect of the short-duration pulse is observed by device 22.

Analog-to-digital converter 36 measures the amplitude of the associated disturbance. Analog-to-digital converter 36 measures the voltage amplitude of the associated disturbance. The impedance of the network can be computed from this voltage measurement. A FOUNDATION™ Fieldbus network will have a computed impedance of approximately 50 ohms. A HART® network will have a computed impedance greater than approximately 125 ohms. If the loop type detected is different than the media access unit (MAU) to which device 22 is connected, the microprocessor 38 will send an error message to the host processor via Com1 (41) to tell the operator to change the network connection to the correct media access unit. If the network or process control loop type detected is the same as the media access unit of device 22, then normal communications can proceed.

In this embodiment, while device 22 is connected to a process control loop and communicating, device 22 preferably can make several diagnostic measurements. For instance, microprocessor 38 can periodically measure the DC loop voltage to ensure that it remains correct and constant. Any significant variation in DC loop voltage would indicate a fault, or impending fault condition on the loop.

Preferably, the Fieldbus measurement circuits 32 provide additional measurement diagnostics for an operating network or process control loop. The AC measurement of the communications signal preferably has filters that enable the measurement of the amplitude of messages on the Fieldbus process control loop. A noise measurement circuit also measures AC voltage but has a lower frequency pass band and is optimized to measure the amplitude of 60 and 120 Hz noise.

As described above pursuant to various embodiments, device 22 provides a number of important advantages over known hand-held devices. Specifically, device 22 can automatically detect a loop connection to a pair of loop connection terminals. Further, device 22 can automatically detect when a loop connection is performed improperly to alert a user to reverse polarity. Further still, device 22 is able to automatically detect the type of the process control loop to which it is coupled and suitably adapt its communication in response thereto.

Device 22 can also provide a number of diagnostics for the loop to which to it is connected. Specifically, device 22 can measure DC network voltage, signal amplitude (for FOUNDATION™ Fieldbus messages) and low-frequency noise amplitude. Further, with respect to FOUNDATION™ Fieldbus diagnostics, device 22 is capable of measuring the amplitude of Fieldbus signal strength and isolate it to particular devices connected to the network. The user can therefore determine the health of devices connected to the FOUNDATION™ Fieldbus network or loop, or determine if a problem exists with the termination of the network. Further still, device 22 can preferably perform the FOUNDATION™ Fieldbus diagnostics set forth in the parent application. Device 22 is also able to preferably provide an indication related to the number of terminators present on a FOUNDATION™ Fieldbus network.

As illustrated in FIG. 2 in one embodiment, device 22 is also preferably provided with memory, such as non-volatile memory 42 and volatile memory 44. The memory provided within device 22 can be used to keep a log of all detected message errors as well as all retry queries. The errors can be correlated with specific process devices or receiver nodes on the process control loop. Information can be collected over time and will provide an effective indication of health of the loop as well as the connected nodes. In some embodiments, non-volatile memory 42 is flash memory and stores program instructions that facilitate higher level diagnostic functionality. Such higher level diagnostics include monitoring the control status of the loops operating in a FOUNDATION™ Fieldbus segment, and/or simulating a particular function block in a control loop in order to help trouble shoot other devices on the network.

Although the present invention has been described with reference to preferred embodiments, workers skilled in the art will recognize that changes may be made in form and detail without departing from the spirit and scope of the invention. For example, although embodiments of the invention were described where the HART® measurement circuitry only measures DC loop voltage, the circuitry could be adapted to measure communications signal amplitude and noise as well.

What is claimed is:

1. A hand-held diagnostic and communication device comprising:
    a first media access unit adapted to communicate over a process control loop in accordance with a first physical layer specification, the first media access unit being coupled to a first set of terminals;
    a second media access unit adapted to communicate over the process control loop in accordance with a second physical layer specification, the second media access unit being coupled to a second set of terminals;
    measurement circuitry coupled to the first and second media access units; and
    a processor coupled to the measurement circuitry and adapted to interact with the measurement circuitry to automatically detect a connection between one of the first and second sets of terminals.

2. The device of claim 1, wherein the processor is adapted to interact with the measurement circuitry to automatically detect a loop type once the device is connected to a process control loop.

3. The device of claim 2 wherein each media access unit is adapted to generate a short duration pulse on the loop without interrupting process loop communication, and wherein the measurement circuitry is adapted to calculate loop impedance based upon loop response to the pulse.

4. The device of claim 3, wherein the processor selects loop type based upon the impedance measure by the measurement circuitry.

5. The device of claim 4, wherein the processor provides diagnostic functions based upon the loop type.

6. The device of claim 4, wherein the processor provides communication functions based upon the loop type.

7. The device of claim 1, wherein the processor is adapted to interact with the measurement circuitry to measure polarity and detect an improper connection.

8. The device of claim 1, wherein the device designed to comply with intrinsic safety.

9. The device of claim 1, wherein the first physical layer specification is in accordance with the Highway Addressable Remote Transducer (HART) protocol.

10. The device of claim 9, wherein the second physical layer specification in accordance with the FOUNDATION Fieldbus protocol.

11. A hand-held diagnostic and communication device comprising:
    a first media access unit adapted to communicate over a process control loop in accordance with a first physical layer specification, the first media access unit being coupled to a first set of terminals;
    a second media access unit adapted to communicate over the process control loop in accordance with a second physical layer specification, the second media access unit being coupled to a second set of terminals;
    measurement circuitry coupled to the first and second media access units; and
    a processor coupled to the measurement circuitry and adapted to interact with the measurement circuitry to automatically detect a loop type once the device is connected to a process control loop.

12. The device of claim 11, wherein the first and second sets of terminals share a common terminal.

13. A method of communicating with a process control device on a process control loop, the method comprising:
    coupling an handheld communicator to the process control loop;

identifying loop type without substantially disturbing loop operation; and adapting loop communication based upon the identified loop type.

14. The method of claim 13, wherein identifying the loop type includes sinking a short current pulse on the loop and measuring loop voltage response to the pulse to calculate loop impedance.

15. The method of claim 13, and further comprising determining if the hand held communicator is correctly coupled to the process control loop.

16. The method of claim 15, wherein the communicator provides an alert if it is improperly connected to the process control loop.

* * * * *

UNITED STATES PATENT AND TRADEMARK OFFICE
CERTIFICATE OF CORRECTION

PATENT NO. : 6,629,059 B2  Page 1 of 1
DATED : September 30, 2003
INVENTOR(S) : Dale W. Borgeson et al.

It is certified that error appears in the above-identified patent and that said Letters Patent is hereby corrected as shown below:

<u>Title page,</u>
Item [56], References Cited, OTHER PUBLICATIONS, insert,

-- "A TCP\IP Tutorial" by, Socolofsky et al., Spider Systems Limited, January 1991 pp. 1-23.

"Approval Standards For Explosionproof Electrical Equipment General Requirements", Factory Mutual Research, Cl. No. 3615, March 1989, pp. 1-34.

"Approval Standard Intrinsically Safe Apparatus and Associated Apparatus For Use In Class I, II, and III, Division 1 Hazardous (Classified) Locations", Factory Mutual Research, Cl. No. 3610, October 1988, pp. 1-70.

"Automation On-line" by, Phillips et al., Plant Services, July 1997, pp. 41-45.

"Climb to New Heights by Controlling your PLCs Over the Internet" by, Phillips et al., Intech, August 1998, pp. 50-51.

"Ethernet emerges as viable, inexpensive fieldbus", Paul G. Schreier, Personal Engineering, December 1997, p. 23-29.

"Ethernet Rules Closed-loop System" by, Eidson et al., Intech, June 1998, pp. 39-42.

"Fieldbus Standard for Use in Industrial Control Systems Part 2: Physical Layer Specification and Service Definition", ISA-S50.02-1992, pp. 1-93.

"Fieldbus Standard for Use in Industrial Control Systems Part 3: Data Link Service Definition", ISA-S50.02-1997, Part 3, August 1997, pp. 1-159.

"Fieldbus Standard For Use in Industrial Control Systems Part 4: Data Link Protocol Specification, ISA-S50.02-1997, Part 4, August 1997, pp. 1-148.

"Fieldbus Support For Process Analysis" by, Blevins et al., Fisher-Rosemount Systems, Inc., 1995, pp. 121-128. --

Signed and Sealed this

Twenty-second Day of June, 2004

JON W. DUDAS
*Acting Director of the United States Patent and Trademark Office*